US008199211B2

(12) United States Patent
Wayne et al.

(10) Patent No.: US 8,199,211 B2
(45) Date of Patent: Jun. 12, 2012

(54) CAMERA DIRECT DAILIES

(75) Inventors: Ian Wayne, Los Angeles, CA (US); Eric Rigney, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 580 days.

(21) Appl. No.: 12/403,210

(22) Filed: Mar. 12, 2009

(65) Prior Publication Data

US 2009/0231459 A1 Sep. 17, 2009

Related U.S. Application Data

(60) Provisional application No. 61/036,010, filed on Mar. 12, 2008, provisional application No. 61/036,005, filed on Mar. 12, 2008, provisional application No. 61/140,520, filed on Dec. 23, 2008.

(51) Int. Cl.
*H04N 5/228* (2006.01)
*H04N 5/262* (2006.01)
*H04N 5/76* (2006.01)
*H04N 9/80* (2006.01)

(52) U.S. Cl. ............... 348/222.1; 348/239; 348/231.3; 348/231.6; 386/239; 386/235

(58) Field of Classification Search ............... 348/222.1, 348/231.1–99; 386/239
See application file for complete search history.

(56) References Cited

U.S. PATENT DOCUMENTS

| | | | | |
|---|---|---|---|---|
| 5,841,512 A * | 11/1998 | Goodhill | ............... | 352/56 |
| 6,868,372 B2 * | 3/2005 | Cuttner et al. | ............... | 703/2 |
| 6,995,793 B1 * | 2/2006 | Albadawi et al. | ............... | 348/239 |
| 8,077,967 B2 * | 12/2011 | Brown | ............... | 382/167 |
| 2002/0032548 A1 * | 3/2002 | Cuttner et al. | ............... | 703/2 |
| 2003/0225641 A1 * | 12/2003 | Gritzmacher et al. | ............... | 705/34 |
| 2005/0163462 A1 * | 7/2005 | Pratt et al. | ............... | 386/4 |

\* cited by examiner

*Primary Examiner* — Lin Ye
*Assistant Examiner* — Chia-Wei A Chen
(74) *Attorney, Agent, or Firm* — Samuel S. Lee; Procopio, Cory, Hargreaves & Savitch LLP

(57) ABSTRACT

Obtaining camera direct dailies using a parallel recording scheme on a set, including; simultaneously recording camera-original video in a master recording session and a lower-resolution proxy recording session; transferring lower-resolution video from the lower-resolution proxy recording session to a stage ingest station; integrating data including sound, logging, color correction, metadata, and high-resolution video from the master recording session at the stage ingest station; and generating camera direct dailies using the integrated data and the video from the lower-resolution proxy recording session.

18 Claims, 5 Drawing Sheets

CAMERA DIRECT DAILIES

CROSS-REFERENCE TO RELATED APPLICATIONS

This application claims the benefit of priority of U.S. Provisional Patent Application No. 61/036,010, filed Mar. 12, 2008, entitled "Direct Camera Dailies," and U.S. Provisional Patent Application No. 61/036,005, filed Mar. 12, 2008, entitled "Smart Slate," and U.S. Provisional Patent Application No. 61/140,520, filed Dec. 23, 2008, entitled "Camera Event Logger." The disclosures of the above-referenced provisional applications are incorporated herein by reference.

BACKGROUND

1. Field of the Invention

The present invention relates to processing of recorded video, and more specifically, to obtaining camera direct dailies by improving such processing of recorded video.

2. Background

In motion picture and video production, a term "dailies" is used to describe the raw, unedited footage shot. This term is referred to as "dailies" because usually at the end of each day, that day's footage is developed, synched to sound, and printed on film in a batch (or converted into television images and transferred onto video tape or disk) for viewing the next day by the director and some members of the film crew. However, the term can be used to refer to any raw footage, regardless of when it is developed or printed.

Viewing dailies allows the film crew to see exactly what images and audio were captured the previous day, allowing them to make sure there are no technical problems such as dirty, scratched, or out of focus film. It also allows the director to ensure the accuracy of the performances of the actors and the variety of the necessary camera angles captured in a scene. Thus, if additional filming is desired, it can often be done immediately rather than re-shooting later when sets may have been torn down and actors may no longer be available.

SUMMARY

In one implementation, a method for obtaining camera direct dailies using a parallel recording scheme on a set is disclosed. The method including: simultaneously recording camera-original video in a high-resolution master recording session and a lower-resolution proxy recording session; transferring lower-resolution video from the lower-resolution proxy recording session to a stage ingest station; integrating data including sound, logging, color correction, metadata, and high-resolution video from the high-resolution master recording session at the stage ingest station; and generating camera direct dailies using the integrated data and the video from the lower-resolution proxy recording session.

In another implementation, a method for obtaining camera direct dailies using a parallel recording scheme on a set is disclosed. The method including: simultaneously recording camera-original video in a master recording session and a lower-resolution proxy recording session; transferring lower-resolution video from the lower-resolution proxy recording session to a stage ingest station; providing a capability to record sound separately; integrating data including sound, logging, color correction, metadata; and generating camera direct dailies using the integrated data and the video from the lower-resolution proxy recording session. High-resolution media is sent to post production for ingest and subsequent creation of digital picture exchange (DPX) files.

In another implementation, a method for obtaining camera direct dailies using a cloning recording scheme on a set is disclosed. The method including: recording camera-original video in a high-resolution master recording session; cloning the camera-original video using two high-resolution decks; simultaneously routing the cloned video and data to an ingest station; receiving and integrating the data including sound, logging, color correction, and metadata; and generating camera direct dailies at the ingest station using the integrated data and video from a lower-resolution proxy recording session.

In another implementation, a system to generate camera direct dailies is disclosed. The system including: a proxy capture recorder configured to record lower-resolution video from camera-original video obtained by a main camera in a proxy recording session, wherein the lower resolution video is produced in conjunction with high-resolution video produced in a master recording session performed substantially simultaneously by the main camera as the proxy recording session; a sound recorder configured to provide a capability to record sound separately; and a stage ingest station configured to receive and integrate the lower resolution video, the high-resolution video, and sound, to generate camera direct dailies.

Other features and advantages of the present invention will become more readily apparent to those of ordinary skill in the art after reviewing the following detailed description and accompanying drawings.

DETAILED DESCRIPTION

Certain implementations as disclosed herein provide techniques for obtaining camera direct dailies by improving the production processing of recorded video such as using a parallel recording scheme. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one implementation, a camera system simultaneously records camera-original video in a high resolution ("master recording") along with a lower resolution, lower cost, file-based representation ("proxy recording"). The lower resolution representation of the recorded video is transferred to a stage ingest station (e.g., by card or wirelessly) and then through a network to a server-based shared environment. The ingest station also provides interfaces for inputting sound, logging and color correction files to be sent to the server. In some situations, on set cloning of the camera master media and routing of the clone video/data stream to the ingest station may also be appropriate.

Figure 1A:
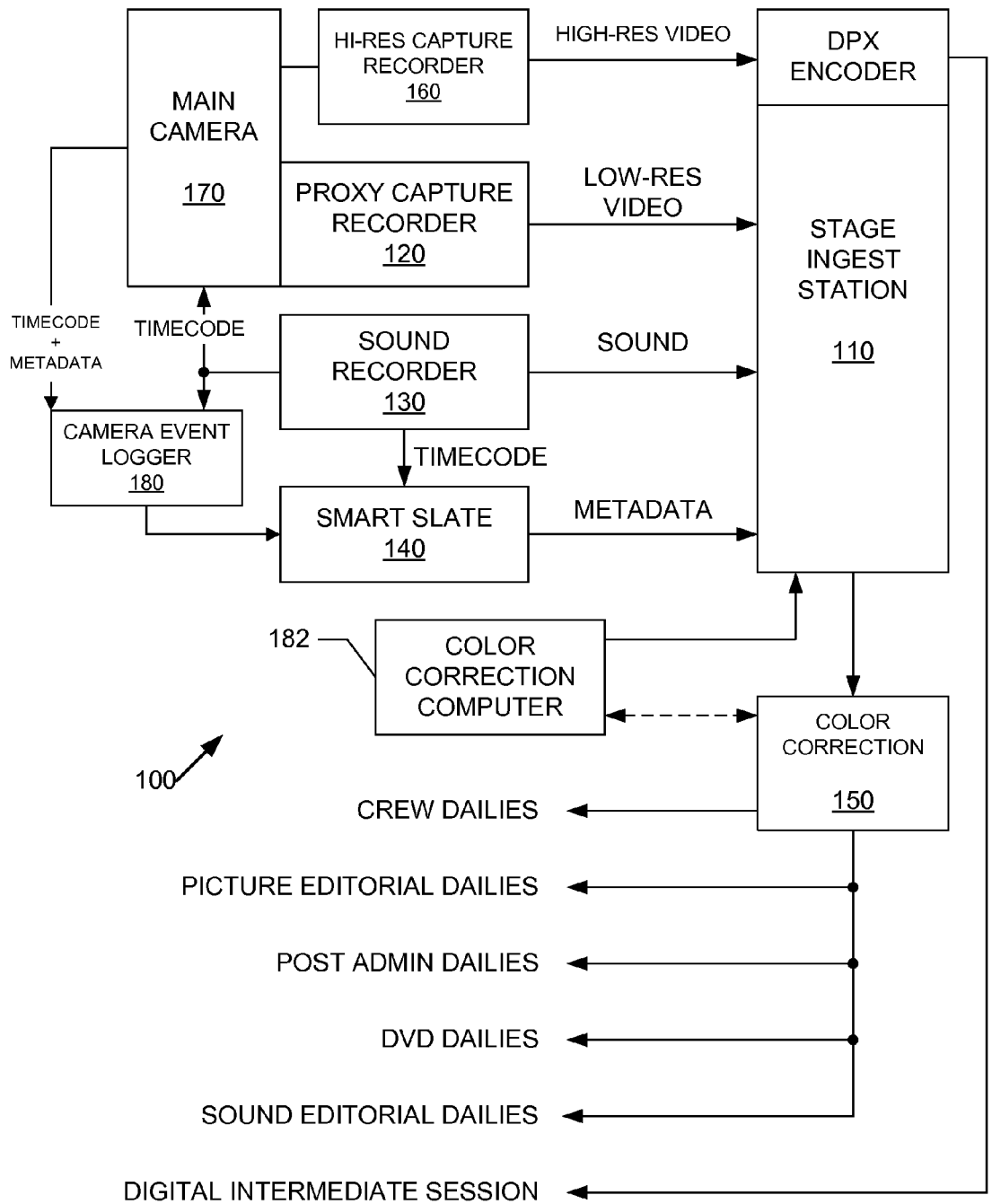
FIG. 1A is a block diagram of a system for camera direct dailies in accordance with one implementation of the present invention.

FIG. 1A is a block diagram of a system 100 for generating camera direct dailies in accordance with one implementation of the present invention. The system 100 includes a stage ingest station with integral digital picture exchange (DPX) encoder 110, a proxy capture recorder 120 coupled to the main camera 170, and a sound recorder 130. The system 100 can also include a smart slate 140, a camera event logger 180, a color correction computer 182, and a color correction module 150. The difference between the color correction computer 182 and the color correction module 150 is described below. The system 102 can also include a high resolution capture recorder 160 coupled to the main camera 170 for recording high-resolution video data, which is passed to the post-production.

The smart slate 140 is used for presenting and recording production information about audio and video sequences during movie or television production. In particular, the slate 140 accepts and records production information tagged with timing information to generate metadata files, which are associated by the ingest station 110 with corresponding recorded data of the audio and video sequences. U.S. Provisional Patent Application No. 61/036,005, filed Mar. 12, 2008, entitled "Smart Slate," describes the smart slate 140 in further detail.

The camera event logger 180 is used for presenting and recording production information about audio and video sequences during movie or television production. In particular, the camera event logger 180 accepts and records production information tagged with timing information to generate metadata files, which are passed through the slate 140 and associated by the ingest station 110 with corresponding recorded data of the audio and video sequences. U.S. Provisional Patent Application No. 61/140,520, filed Dec. 23, 2008, entitled "Camera Event Logger," describes the camera event logger 180 in further detail.

Figure 1B:
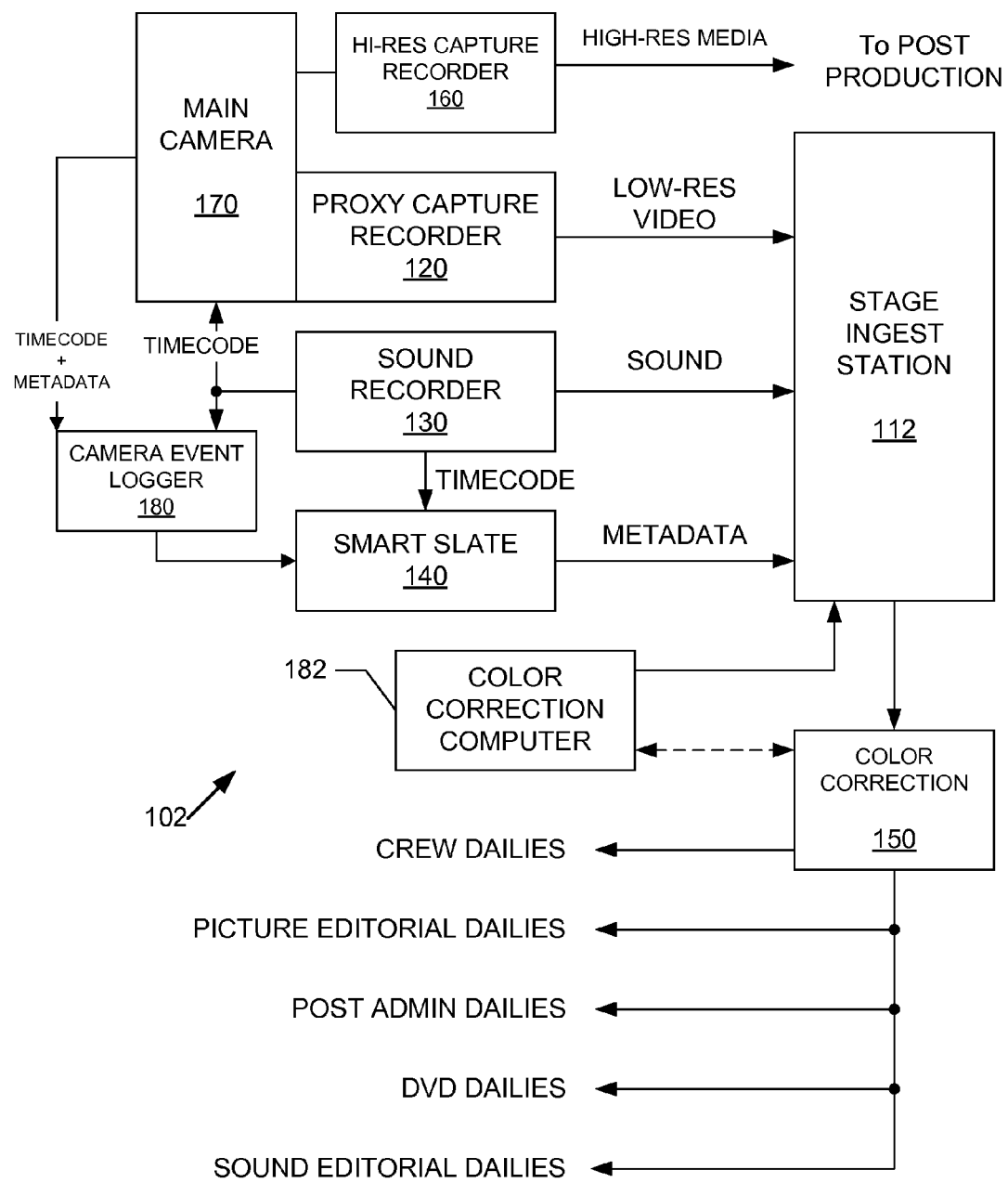
FIG. 1B is a block diagram of a system for camera direct dailies in accordance with another implementation of the present invention.

FIG. 1B is a block diagram of a system 102 for generating camera direct dailies in accordance with another implementation of the present invention. The system 102 includes a stage ingest station 112, a proxy capture recorder 120 coupled to a main camera 170, and a sound recorder 130. The system 100 can also include a smart slate 140, a camera event logger 180, a color correction computer 182, and a color correction module 150. In this system 102, the high-resolution media generated by the high-resolution capture recorder 160 is passed to post production instead of the ingest station 112. The system 102 can also include a high resolution capture recorder 160 coupled to the main camera 170 for recording high-resolution video data, which is passed to the DPX encoder in the ingest station 110.

Figure 1C:
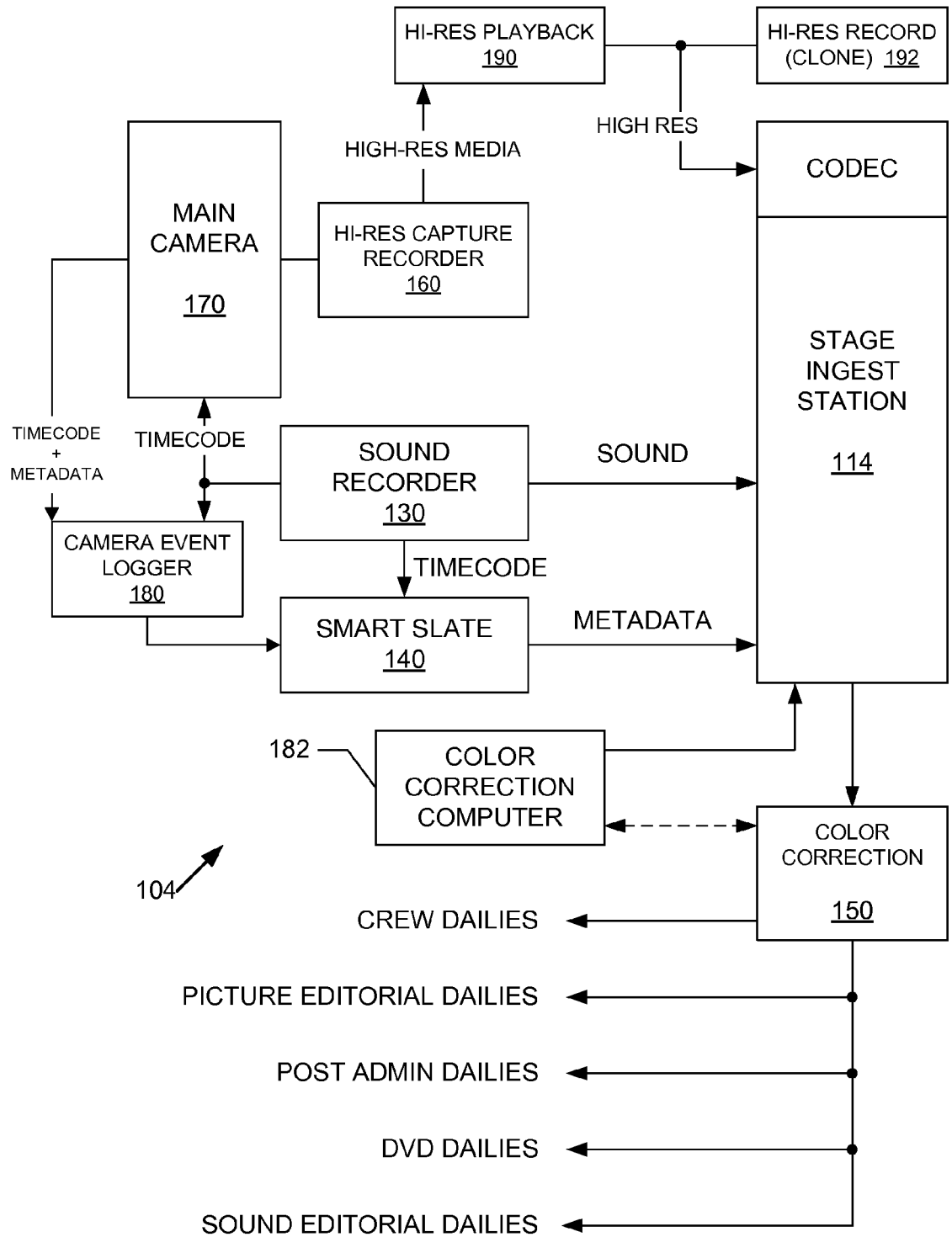
FIG. 1C is a block diagram of a system for camera direct dailies in accordance with another implementation of the present invention.

FIG. 1C is a block diagram of a system 104 for generating camera direct dailies in accordance with yet another implementation of the present invention. The system 104 further includes a stage ingest station with integral CODEC 114, a high-resolution playback deck 190, and a high-resolution record deck 192. As with other implementations, the system 100 can also include a sound recorder 130, a smart slate 140, a camera event logger 180, a color correction computer 182, and a color correction module 150. The system 104 can also include a high resolution capture recorder 160 coupled to the main camera 170 for recording high-resolution video data.

In one implementation, the proxy capture recorder 120 is a lightweight, battery-operated solid state recorder attached to the main camera 170. The high-definition serial digital interface (HD-SDI) output of the main camera 170 is fed to the proxy capture recorder 120 and saved as lower resolution video data. The proxy recorder is automatically placed into record by camera timecode information embedded in the HD-SDI stream. In one configuration, this video data includes camera timecode (e.g., nominally 24 fps), date, roll, and camera ID. In another configuration, the proxy capture recorder 120 is capable of recording sound time code (e.g., nominally 30 fps) as an audio track. In another configuration, the proxy capture recorder 120 is capable of embedding sound time code (e.g., nominally 30 fps) in an HD-SDI video stream. The proxy capture recorder 120 is an adjunct to the high-resolution capture made by a high-definition main camera 170, which is recorded onto a high-resolution camera recorder 160. However, proxy capture can be readily adapted to 2K (e.g., 2048×1536 pixels) or 4K (e.g., 4096×3072 pixels) acquisition cameras. The proxy capture recorder 120 also provides "on-the-fly" transcoding using appropriate codecs.

In another implementation, the ingest station 110 includes one or more programmable processors to store and execute instructions, such as to provide the capturing and processing of the lower resolution video, the coordination between the higher and lower resolution video data, and the transportation and storage of the video data as Material eXchange Format (MXF) files into the shared network environment. The resultant MXF files then become available for the post production process. Alternatively (e.g., when working from a remote location), it may be desirable to create a simultaneous high-resolution (e.g., HDCAM-SR) clone, concurrently with the creation of MXF files. This requires two high-resolution decks, an ingest station, and additional monitoring equipment. This approach substantially reduces a need to make a protection copy in post production. In another alternative approach, a secondary MXF file can be created while cloning the master high-resolution tape at the post production facility. While cloning the camera high resolution, 2 k/4 k files can be created and saved as DPX files to the archive. Substantially simultaneously, compressed picture files can either be created as an adjunct to the cloning stage (with "baked in" color correction if desired), or as an automated transcode subsequent to the 2 k/4 k file creation. Dailies can be screened either from the HDCAM SR clone, the 2 k/4 k workstation, or the compressed HD (e.g., MXF files at Avid preview level compression) picture workstation.

In another implementation, the sound recorder 130 provides a capability to record sound separately. Films are traditionally shot with dual-system recording, where picture is recorded on camera, and sync sound is recorded to a separate sound recording device. Picture and sound are then synced up in post-production. Traditionally, this was done manually by lining up the image of the just-closed clapsticks with their characteristic "Click!" on the sound recording. Today, practically every camera used for digital cinematography can record sound internally, already in sync with picture. Thus, in theory, this eliminates the need for syncing picture with sound in post production, which can lead to faster workflows. However, most sound recording is done by specialist operators, and the sound will likely be recorded separately and further processed in post-production. Moreover, software problems can cause unpredictable sound-picture timing problems or even complete loss of sound recording which need to be corrected. Accordingly, experienced operators often use slates with clapstick and timecode (with the timecode reader/ generator attached to the slate) since this can provide a visual record of the sound timecode value.

The sound recorder 130 generates master, nominal 30 frames per second (fps) timecode and may either be transmitted to, or used as a jamming source for the camera 170, the camera event logger 180, and the smart slate 140. It will be necessary for the sound recording technician to enter roll and date information as metadata for use in the auto logging and synchronizing process. As sound media becomes available from the recorder (after a "reel change", for example), it is presented to the ingest station 110 for upload.

When shooting digitally, response to light is determined by the CMOS or CCD sensor(s) in the camera 170 and recorded and "developed" directly. That is, a cinematographer can measure and predict the appearance of the final image if the cinematographer is familiar with the specific model of the camera and picture monitor being used or able to read a vector or waveform monitor. Thus, on-set monitoring allows the cinematographer to view the actual images that are captured, immediately on the set. If it is desired, color lookup table (LUT) values, which represent the cinematographer's creative "look" preferences, can be generated by the color correction computer 182 working in conjunction with the color correction processor 150 and saved in an appropriate format for downstream color correction. The files are saved with scene and take identifiers, and are then presented to the ingest station.

In one implementation, the stage ingest station 110 is configured as a workstation which integrates all input data as correlated clips with database documentation. The station 110 syncs multiple camera pictures and associated production audio, then merges all available metadata provided to those media files. The ingest station 110 performs a first level quality control operation to detect incompatible frame rates, timecode standards, missing identifiers, and others. These problems would be logged and available for immediate correction on the set. The stage ingest station 110 generates camera direct crew dailies, picture editorial dailies, post administrative dailies, DVD dailies, and sound editorial dailies.

In a parallel recording scheme, discrepancies can exist between the master recording and the proxy version. A tape dropout or camera processor "hiccup" may not be reflected in the master recording output HD-SDI stream. In this case, the editor may continue to work with no knowledge of the discrepancies, and cut in a scene that might not be useable when the master recording finally makes it to an online. To address this problem, a means of automatically replacing low-resolution (e.g., MXF) files with their high resolution counterparts is provided for in the shared network environment. It should be noted that the MXF is an open file format, targeted at the interchange of audio-visual material with associated data and metadata. It has been designed and implemented with the aim of improving file-based interoperability between servers, workstations and other content-creation devices. These improvements should result in improved workflows and in more efficient working practices.

Figure 2:
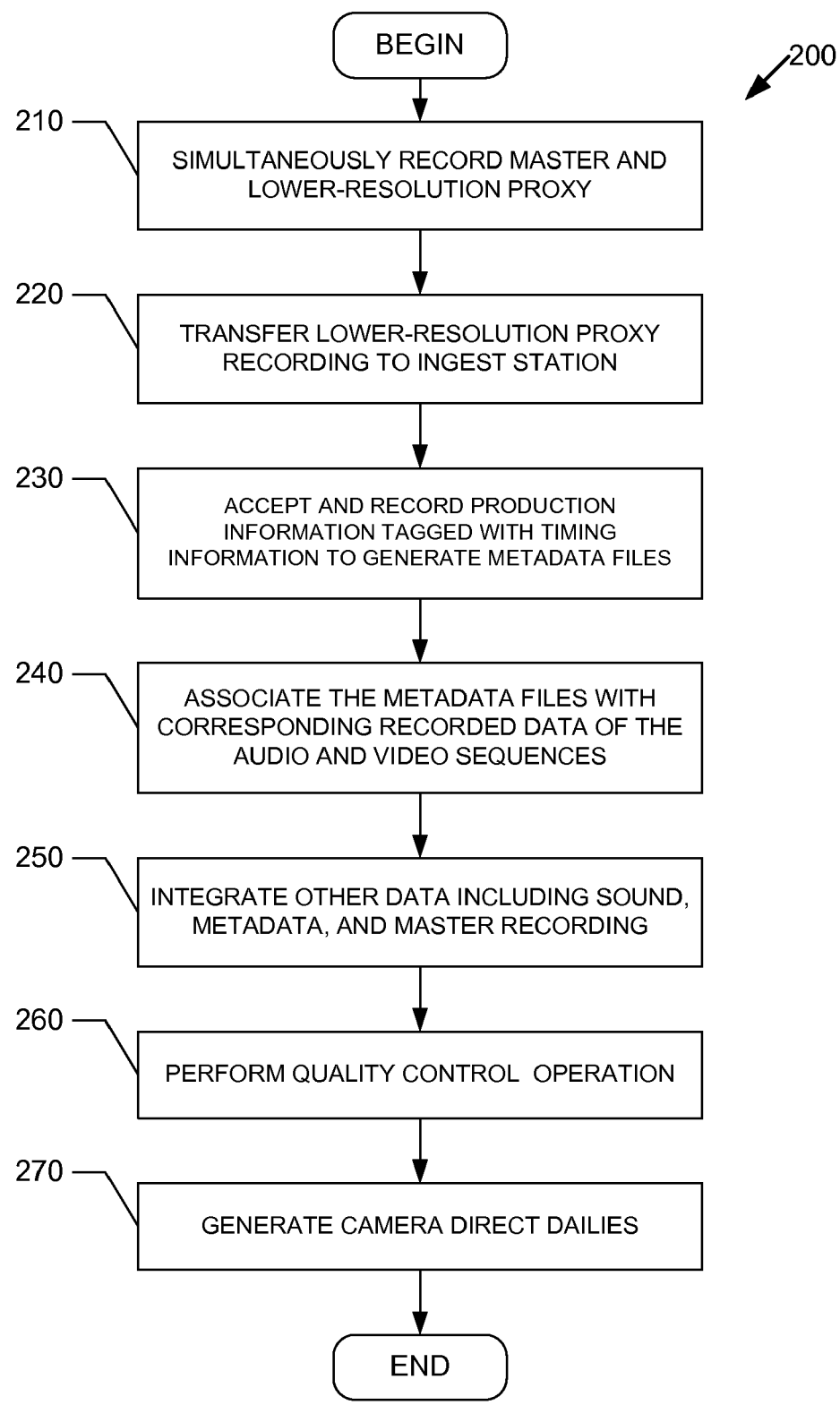
FIG. 2 shows a flowchart illustrating a process for obtaining camera direct dailies by using parallel recording scheme in accordance with one implementation of the present invention.

FIG. 2 shows a flowchart 200 illustrating a process for obtaining camera direct dailies by using a parallel recording scheme in accordance with one implementation of the present invention. In the illustrated implementation of FIG. 2, the process includes simultaneously recording, at box 210, camera-original video in a high-resolution master recording session and a lower-resolution proxy recording session. Then, at box 220, lower-resolution proxy recording of the video is transferred to a stage ingest station (e.g., by card or wirelessly) and then through a network to a server.

At box 230, production information tagged with timing information is accepted and recorded by the camera event logger to generate metadata files, which are passed through the slate and associated, at box 240, by the stage ingest station with corresponding recorded data of the audio and video sequences. Other data including sound, logging, color correction, metadata, as well as high-resolution master recording are integrated, at box 250, to be sent to the server. A quality control operation is performed, at box 260, to detect incompatible frame rates, timecode standards, missing identifiers, and other discrepancies. These problems would be logged and available for immediate correction on the set. Then, camera direct dailies including crew dailies, picture editorial dailies, post administrative dailies, DVD dailies, and sound editorial dailies are generated, at box 270.

Figure 3:
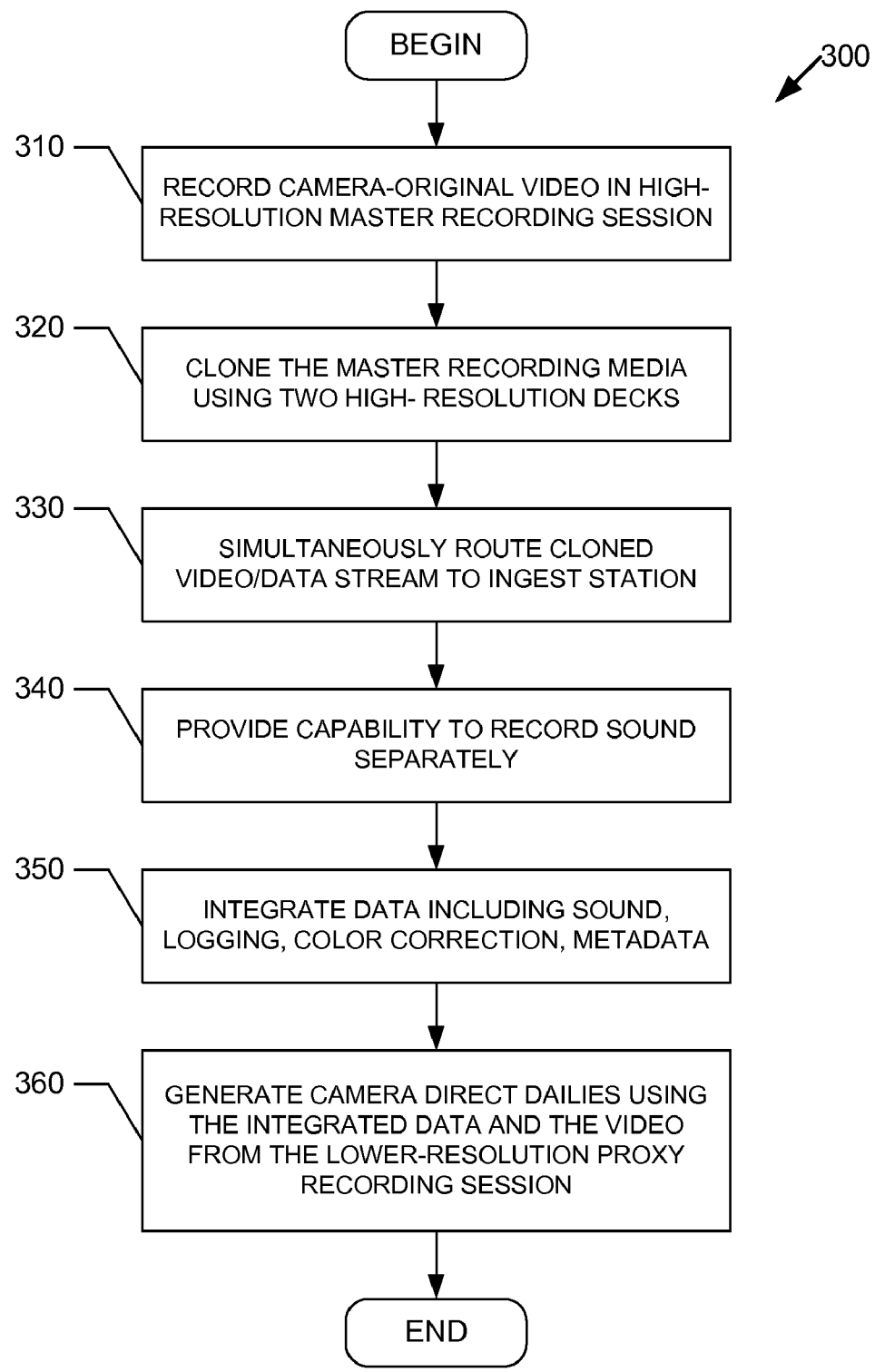
FIG. 3 shows a flowchart illustrating a process for obtaining camera direct dailies by using a cloning recording scheme in accordance with another implementation of the present invention.

FIG. 3 shows a flowchart 300 illustrating a process for obtaining camera direct dailies by using a cloning recording scheme in accordance with another implementation of the present invention. In the illustrated implementation of FIG. 3, the process includes recording camera-original video in a high-resolution master recording session, at box 310. The master recording media is then cloned, at box 320, using two high-resolution decks. Further, at box 330, the cloned video/data stream is simultaneously routed to a stage ingest station. A capability to record sound is also provided separately, at box 340. Then, at box 350, data including sound, logging, color correction, and metadata is integrated, and camera direct dailies are generated, at box 360, using the integrated data and the video from the lower-resolution proxy recording session. High-resolution media is sent to post production for ingest and subsequent creation of DPX files.

Various implementations of the invention are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

The invention claimed is:

1. A method for obtaining camera direct dailies using a parallel recording scheme on a set, the method comprising;
    simultaneously recording camera-original video in a master recording session and a lower-resolution proxy recording session;
    transferring lower-resolution video from the lower-resolution proxy recording session to a stage ingest station;
    integrating data including sound, logging, color correction, metadata, and high-resolution video from the master recording session at the stage ingest station; and
    generating camera direct dailies using the integrated data and the video from the lower-resolution proxy recording session.

2. The method of claim 1, further comprising
    performing a quality control operation in the parallel recording scheme to detect any discrepancies.

3. The method of claim 2, wherein the quality control operation includes
    detecting incompatible frame rates.

4. The method of claim 2, wherein the quality control operation includes
    detecting incompatible timecode standards.

5. The method of claim 2, wherein the quality control operation includes
    detecting incompatible missing identifiers.

6. The method of claim 2, further comprising
    performing an immediate correction on the set to correct the discrepancies.

7. The method of claim 1, further comprising
    performing an on set cloning of the high-resolution video using a high-resolution recording deck substantially simultaneously with proxy recording.

8. The method of claim 1, further comprising
    recording sound separately.

9. A system for generating camera direct dailies, the system comprising:
    a proxy capture recorder configured to record lower-resolution video from camera-original video obtained by a main camera in a proxy recording session,
    wherein the lower resolution video is produced in conjunction with high-resolution video produced in a master recording session performed substantially simultaneously by the main camera as the proxy recording session;
    a sound recorder configured to provide a capability to record sound separately; and
    a stage ingest station configured to receive and integrate the lower-resolution video, the high-resolution video, and sound, to generate camera direct dailies.

10. The system of claim 9, further comprising
    a slate configured to present and record production information about audio and video sequences, the slate operating to output the production information tagged with timing information as metadata.

11. The system of claim 10, wherein the metadata is associated with corresponding recorded data of the audio and video sequences.

12. The system of claim 10, further comprising
    a camera event logger configured to accept and record the production information tagged with timing information to generate metadata files,
    wherein the metadata files are passed through the slate and associated by the stage ingest station with corresponding recorded data of the audio and video sequences.

13. The system of claim 9, wherein the proxy capture recorder is a battery-operated solid state recorder attached to the main camera.

14. The system of claim 9, wherein the proxy capture recorder is configured to embed timecode in its HD-SDI stream.

15. The system of claim 9, wherein the lower-resolution video to be saved on the proxy capture recorder is received from a high-definition serial digital interface (HD-SDI) output of the main camera.

16. The system of claim 9, wherein the lower resolution video includes camera timecode, date, roll, and camera ID.

17. The system of claim 9, wherein the proxy capture recorder is capable of recording sound time code as an audio track.

18. The system of claim 9, wherein the proxy capture recorder includes one or more programmable processors to capture and process the lower resolution video, to coordinate between high and lower resolution video, and to store and transport the lower resolution video through the ingest station into the shared network environment.

* * * * *